United States Patent [19]

Miyoshi et al.

[11] Patent Number: 4,670,333

[45] Date of Patent: Jun. 2, 1987

[54] MAGNETIC RECORDING MEDIA

[75] Inventors: Takahito Miyoshi, Odawara; Toshimitu Okutu, Minami-ashigara; Masahiro Utumi, Hadano; Masaaki Fujiyama; Nobuo Aoki, both of Minami-ashigara, all of Japan

[73] Assignee: Fuji Photo Film Co., Ltd., Kanagawa, Japan

[21] Appl. No.: 727,214

[22] Filed: Apr. 25, 1985

[30] Foreign Application Priority Data

Apr. 27, 1984 [JP] Japan .................................. 59-83694

[51] Int. Cl.$^4$ .............................................. G11B 5/72
[52] U.S. Cl. ...................................... 428/323; 427/128; 427/131; 428/328; 428/329; 428/403; 428/694; 428/695; 428/900; 428/336
[58] Field of Search ................ 427/131, 128; 428/694, 428/695, 328, 329, 900, 323, 403, 336; 360/134–136

[56] References Cited

U.S. PATENT DOCUMENTS

| 4,390,601 | 6/1983 | Ono | 427/131 |
| 4,456,661 | 6/1984 | Yamamoto | 427/131 |
| 4,511,617 | 4/1985 | Hideyama | 428/694 |
| 4,540,618 | 9/1985 | Suzuki | 428/695 |
| 4,555,431 | 11/1985 | Miyatsuka | 428/694 |

*Primary Examiner*—Ellis P. Robinson
*Attorney, Agent, or Firm*—Burns, Doane, Swecker & Mathis

[57] ABSTRACT

A magnetic recording medium including a nonmagnetic support having a magnetic layer on one side thereof and a backing layer on the opposite side thereof, said backing layer comprising a fatty acid having 12 or more carbon atoms and copper or copper ions. Fatty acid is saturated or unsaturated, and copper is 0.2 micron or less in size.

8 Claims, No Drawings

MAGNETIC RECORDING MEDIA

FIELD OF THE INVENTION

The present invention relates to a magnetic recording medium and, more specifically, to a backing layer excelling in running durability, and having a low coefficient of friction and low surface electric resistance.

BACKGROUND OF THE INVENTION

In magnetic tapes for audio, video or computer purposes, in general, there is recently an increasing demand for high-density recording, so that conventional Co-containing magnetic iron oxides are being more finely divided. Attention is also being paid to the thin-film type magnetic recording media of ferromagnetic metals, which rely upon ferromagnetic alloy powders, or are formed by the vapor deposition techniques such as vacuum deposition, sputtering and ion plating, said media being now put to practical use.

In such audio, video or computer magnetic tapes, the magnetic layers are finished to a smooth surface to improve the sensitivity (especially the output in a high-frequency range). In coating type magnetic layers, on the other hand, the content of pulverulent bodies other than ferromagnetic powders is reduced as much as possible so as to increase the degree of packing. Thus, the resulting magnetic layers contain a reduced or limited amount of carbon black or the like.

For that reason, in some cases, no improvement might be introduced in running characteristics with conventional backing layers with a smooth surface, the irregularity of which is transferred to the magnetic layers to a lesser extent, and which are composed only of inorganic powders and binders.

In recent years, the total thickness of magnetic tapes tends to be reduced as much as possible, and is now in most cases made no higher than about 20 microns. This is accompanied by a reduction in the thickness of the associated backing layers, and often causes that they are coated in a thickness of no higher than 2 microns. Thus, the reductions in the total thickness of magnetic tapes are entrained by a drop in the strength thereof, and have adverse influences upon running characteristics, running durability, take-up characteristics, output variations, etc. due to static electricity.

SUMMARY OF THE DISCLOSURE

One object of the present invention is to provide novel magnetic recording media including a backing layer having a reduced coefficient of friction without incurring any increase in surface electric resistance.

Another object of the present invention is to provide novel magnetic recording media including a backing layer which is suitably applicable to the magnetic tapes of both the coating type and the metal thin-film type without damaging the S/N characteristics of the magnetic layers.

In consequence of intensive studies made of additives other than inorganic powders, carbon black and binders in backing layers having a thickness of no higher than 2 microns in particular, it has been found that the aforesaid drawbacks are significantly eliminated by the addition of a fatty acid having 12 or more carbon atoms and copper or copper ions.

More specifically, according to the present invention there is provided a magnetic recording medium including a nonmagnetic support provided with a magnetic layer on one side of said support and a backing layer on the opposite or other side thereof, said backing layer having a thickness of no higher than 2 microns and containing carbon black and binders and, if required, fillers, and being characterized by further containing a saturated or unsaturated fatty acid having 12 or more carbon atoms and copper or copper ions.

DETAILED DESCRIPTION OF THE PREFERRED EMBODIMENT

The fatty acid to be used in the present invention may include ones having no more than 30 carbon atoms, for instance, saturated fatty acids such as lauric, myristic, palmitic, stearic and behenic acids, and unsaturated fatty acids such as oleic, erucic, linoleic and linolenic acids. A fatty acid exceeding 30 carbon atoms brings about a higher melting point, gives rise to an occurrence of white powder, or provides poor lubricating effect (particularly the temperature dependence thereof). Thus the carbon atom number should be preferably no more than 26, most preferably no more than 22.

Reference will now be made to the copper or copper ions to be used in the present invention. When metallic copper is used as the copper, it should have a particle size of preferably no higher than 0.2 micron ($\mu$m), more preferably 0.02 to 0.1 micron. If the copper size exceeds 0.2 micron it is difficult to reduce the surface roughness Ra to less than 0.1 micron (cut-off of 0.08 mm), whereupon the coarse surface of the backing layer is transferred to the magnetic layer when superposed, resulting in a deterioration of the electromagnetic transforming characteristics. Where copper ions are used, $Cu^{2+}$ ions dissociated from incorporated fatty acid copper or aromatic carboxylic acid copper are allowed to be present on the surface of fillers (inorganic powders including carbon black). Fatty acid residue of the fatty acid copper is preferably the same as ones mentioned hereinbelow and may be those having at least 12 carbon atoms such as oleic acid, stearic acid, behenic acid or the like. Aromatic carboxylic acid may include benzoic acid, salicylic acid p-hydroxy benzoic acid or the like.

The amount of the saturated or unsaturated fatty acid having 12 or more carbon atoms to be added per 100 parts by weight of the fillers (inorganic powders including carbon black) is preferably 0.1 to 10 parts by weight, more preferably 0.2 to 5 parts by weight.

The amount of metallic copper to be added as the copper is preferably 0.05 to 10 parts by weight, more preferably 0.1 to 5 parts by weight per 100 parts by weight of the fillers (inorganic powders including carbon black).

Referring to the amount of copper ions, it is preferred that ESCA analysis of the surface of the fillers (the backing layer) indicates that they are present in a content of 0.01 to 1.0% in the form of $Cu^{2+}$. The backing layer may contain lubricants such as silicone oil and other antistatic agents such as surface active agents.

It has thus been found that the presence of the combination of the fatty acid with the metal copper or the copper ions in the backing layer provides significant improvements in running characteristics and antistatic effect (see Table 1 to be given later).

The fillers used for the backing layers of the magnetic recording media according to the present invention may be inorganic powders which may include carbon black, graphite, titanium oxide, barium sulfate, ZnS, $MgCO_3$, ZnO, $Fe_3O_4$, $SnO_2$, $SiO_2$, $Cr_2O_3$, alpha-$Al_2O_3$, SiC, etc. Among others, preference is given to carbon black, graphite, titanium oxide, barium sulfate, CaCO₃, etc.

As the binders for the backing layers, use may be made of those known in the art such as, for instance, thermoplastic resins, thermosetting resins, reactive type resins or mixtures thereof.

The thermoplastic resins used may include vinyl chloride-vinyl acetate copolymers, vinyl chloride-vinylidene chloride copolymers, vinyl chloride-acrylonitrile copolymers, acrylate-acrylonitrile copolymers, acrylate-vinlylidene chloride copolymers, acrylate-stryene copolymers, methacrylate-acrylonitrile copolymers, methacrylate-vinylidene chloride copolymers, methacrylate-styrene copolymers, urethane elastomers, polyvinyl fluoride, vinylidene chloride-acrylonitrile copolymers, butadiene-acrylonitrile copolymers, polyamide resins, polyvinyl butyrals, cellulosic resins (celloulose acetate butylate, cellulose diacetate, cellulose propionate, nitrocellulose, etc.), styrene-butadiene copolymers, polyester resins, chlorovinyl ether-acrylate copolymers, amino resins, various rubber base resins, etc.

The thermosetting or reactive type resins used may embrace phenol resins, epoxy resins, polyurethane setting type resins, urea resins, melamine resins, alkyd resins, acrylic reactive resins, polyisocyanates, polyamines, etc.

Among others, the most preference is given to three-component systems of cellulosic resins, thermoplastic polyurethane elastomers and polyisocyanates.

The cellulosic resins used may suitably be cellulose derivatives such as nitrocellulose, and serve to impart heat resistance, toughness and anti-blocking properties.

As the thermoplastic polyurethane elastomers, use may be substantially be made of almost all the commercially available products. More specifically, use may be made of polyester-polyurethane resins and polyether-polyurethane resins prepared by the urethanation of polyester-polyols obtained by the reaction of organic dibasic acids (such as phthalic acid, adipic acid, dimerized linoleic acid or maleic acid) with glycols (such as ethylene glycol, propylene glycol, butylene glycol or diethylene glycol, etc.) or polyvalent alcohols (such as trimethylol-propane, hexanetriol, glycerin, trimethylolethane or pentaerythritol) with the use of polyisocyanate compounds such as tolylene-diisocyanate, 4,4'-diphenylmethane-diisocyanate, hexamethylene-diisocyanate or m-xylylene-diisocyanate, as well as resins having a ring

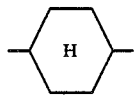

in the molecular skeleton and expressed in terms of the general formula (I):

[(O—R—OOC—R¹—CO)ₘOROOCNH—R²—NHCO—]   (1)

wherein m is an integer of 5 to 100; R represents a divalent alicyclic or aromatic residue having at least two hydroxyalkyl or hydroxyalkoxyl groups having 1 to 4 carbon atoms; R¹ represents

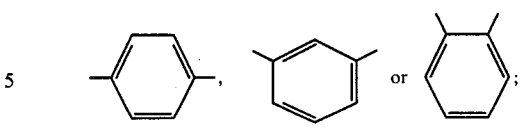

R² respresents

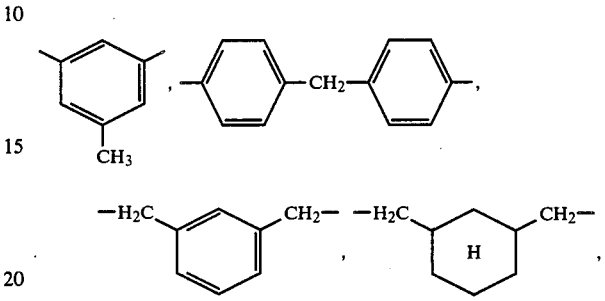

or (CH₂)ₙ; n is an integer of 4 to 6.

The molecular weight of such elastomers is effectively 5,000 to 500,000, preferably 10,000 to 200,000. These polyrethanes are disclosed in Japanese Patent Kokai-Publication No. 55-122234.

Polyisocyanates which may be used in the present invention are 2,4-tolylene-diisocyanate, 1,6-hexabutylene-diisocyanate, triisocyanate (e.g., "Colonate L" manufactured by Nippon Polyurethane Co., Ltd.), etc.

Per 100 parts by weight of the binder are preferably used 20-80 parts by weight of cellulosic resin, 20 to 50 parts by weight of thermoplastic polyurethane elastomer and 10 to 50 parts by weight of polyisocyanate.

The ratio of the inorganic powders to the binder (P/B ratio) in the backing layer used in the present invention is in a range of 4/1-0.1/1 (preferably 2/1-0.7/1) by weight. At a P/B ratio of more than 4/1 powder separation (drop off) or wear may be caused, while at a P/B ratio of less than 0.1/1 the coefficient of friction increases entailing a deterioration in running durability.

The backing layer of the present invention is selected such that the total thickness of the magnetic recording medium (magnetic layer + support + backing layer) is to be reduced as much as possible with a view to increasing the recording density per unit volume. Such a backing layer has a thickness of preferably 0.3 to 1.5 microns.

In the present invention, preferred results are obtained, when the backing layer has a surface roughness as the average centerline roughness (Ra) of no more than 0.10 micron under a cut-off of 0.08 mm, Ra should be more preferably 0.10 micron or less, and most preferably, 0.05 micron or less.

According to the present invention, magnetic recording media having the above-mentioned characteristics are obtained. In conventional techniques, however, if the backing layer is made thin, it is destroyed (is worn during the running thereof). It is to be understood that the present invention is free from such drawbacks. In addition, by using the backing layer of the present invention, the video S/N characteristics are not deteriorated even in high-density recording with a recording wave length of as high as 1.3 microns.

The magnetic recording media may be prepared according to the manner and with the materials as disclosed in Japanese Patent Kokai-Publication No. 52-108804 U.S. Pat. No. 4,135,016).

The magnetic layers used in the present invention may be any one of gamma-iron oxides, iron oxides modified with Co, products obtained by dispersing and coating ferromagnetic metal powders into and onto binders, or thin-film layers of magnetic metals.

Besides the aforesaid fillers, the backing layers may contain known antistatic agents, lubricants, etc. In the present invention, however, the incorporation of such agents is not necessarily used. In other words, as compared with the use of such agents, the present invention provides a tape having a backing layer with a reduced amount of wear, and the strength of which does not drop resulting in a tape with a high stiffness, so that no edge breakage takes place, and improved running durability is obtained.

The present invention will now be explained in further detail with reference to the following non-restrictive examples and comparison examples, wherein "part" means "part by weight".

EXAMPLE

A PET base support of 14 microns in thickness was applied on one side with a magnetic layer including Co-containing gamma-iron oxide and on the other side with a backing layer.

The backing layer was applied in such manner that its thickness reached 5 microns after drying. The backing layer was applied in the following manner. A mixture of the following composition was dispersed for 20 hours with the use of a ball mill dispersing machine.

Powdery $CaCO_3$ (having a mean particle size of 0.07 microns): 100 parts;
Carbon (having a means particle size of 0.017 microns): 20 parts;
Nitrocellulose: 40 parts;
Polyurethane: 40 parts;
Fatty Acid: 0.5 parts;
Powdery Cu (having a particle size of 0.06 microns): 0.2 parts;
Polyisocyanate: 40 parts.

The ball-milled product was coated in such manner that its thickness reached 1 micron after drying. The powdery Cu and fatty acid used are set forth in Table 1.

In Example 2, $Cu^{++}$ ion was obtained by incorporation of copper oleate and dissociation thereof. In Examples 1, 3 and 4, Cu is metallic copper powder having an average particle size of 0.07 micron.

surface electric resistance ($\Omega$) of Comparison Examples 5 and 6 are much larger than that of other examples.

In Examples 1 to 3 of the present invention, on the other hand, both the coefficient of dynamic friction ($\mu$) and the surface electric resistance are improved with improvements in running durability and antistatic properties (i.e., within the desired range of the present invention, $\mu$ of no more than 0.26 and no more than $10^{10}$, respectively). From the experimental results as tabulated, it is considered that the addition of the fatty acid to the backing layer make a considerable contribution to improvements in the running durability, whereas the addition of copper or copper ions makes a significant contribution to the antistatic properties.

What is claimed is:

1. A magnetic recording medium including a non-magnetic support having a magnetic layer on one side thereof and a backing layer on the opposite side thereof, said backing layer having a thickness of 2 microns or less and comprising (a) a fatty acid having 12 or more carbon atoms, (b) copper having an average particle size of 0.2 micron or less and/or copper ions, (c) filler, and (d) binder, said filler and binder in a ratio by weight of 4/1 to 0.1/1, and said fatty acid being present in an amount of 0.1 to 10 parts by weight per 100 parts by weight of the filler.

2. A magnetic recording medium as defined in claim 1, wherein fatty acid has no more than 30 carbon atoms.

3. A magnetic recording medium as defined in claim 1, wherein fatty acid includes at least one saturated fatty acid selected from the group consisting of lauric, myristic, palmitic, stearic and behenic acids.

4. A magnetic recording medium as defined in claim 1, wherein fatty acid includes at least one unsaturated fatty acid selected from the group consisting of oleic, erucic, linoleic and linolenic acids.

5. A magnetic recording medium as defined in claim 4, wherein said backing layer includes 0.05 to 10 parts by weight of metallic copper per 100 parts by weight of the filler.

6. A magnetic recording medium as defined in claim 1, wherein copper is present as metallic copper powder in an amount of 0.05 to 10 parts by weight per 100 parts by weight of the filler.

7. A magnetic recording medium as defined in claim 1, wherein copper ions are present in such an amount that 0.01 to 1.0% by weight of $Cu^{2+}$ is detected on the filler surface.

8. A magnetic recording medium as defined in claim

TABLE 1

| No. | Free from both $Cu^{++}$ and Cu | $Cu^{++}$ | Cu | Oleic Acid | Stearic Acid | Capric Acid | Coefficient of Dynamic Friction ($\mu$) | Surface Electric Resistance ($\Omega$) |
|---|---|---|---|---|---|---|---|---|
| Example 1 | | | | | | | 0.21 | $10^6$ |
| Example 2 | | | | | | | 0.21 | $10^8$ |
| Example 3 | | | | | | | 0.22 | $10^7$ |
| Comparison Example 4 | | | | | | | *0.30 | $10^7$ |
| Comparison Example 5 | | | | | | | 0.23 | *$10^{12}$ |
| Comparison Example 6 | | | | | | | 0.21 | *$10^{12}$ |

It is understood from the results of Examples 1–3 and Comparison Examples 4–6 (Table 1) that the coefficient of dynamic friction ($\mu$) of Comparison Example 4 is relatively larger than those of other examples, and the 1, wherein copper ions are present through dissociation of fatty acid copper or aromatic carboxylic acid copper as added.

* * * * *